United States Patent
Loria et al.

(10) Patent No.: US 9,266,536 B2
(45) Date of Patent: Feb. 23, 2016

(54) ADAPTIVE CRUISE CONTROL SYSTEM AND METHOD

(71) Applicants: Nathan Loria, Royal Oak, MI (US); Michael J Bliss, Troy, MI (US); Stephen J Buckley, Novi, MI (US); Douglas D Wellman, Chesterfield, MI (US); Adam C Chiapetta, Rochester, MI (US)

(72) Inventors: Nathan Loria, Royal Oak, MI (US); Michael J Bliss, Troy, MI (US); Stephen J Buckley, Novi, MI (US); Douglas D Wellman, Chesterfield, MI (US); Adam C Chiapetta, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/158,202

(22) Filed: Jan. 17, 2014

(65) Prior Publication Data
US 2015/0203108 A1  Jul. 23, 2015

(51) Int. Cl.
*B60T 8/32* (2006.01)
*B60W 50/00* (2006.01)
*B60W 30/16* (2012.01)
*B60W 30/17* (2012.01)

(52) U.S. Cl.
CPC .......... *B60W 50/0098* (2013.01); *B60W 30/16* (2013.01); *B60W 30/17* (2013.01); *B60W 2050/0089* (2013.01); *B60W 2540/28* (2013.01)

(58) Field of Classification Search
CPC .................. B60W 2540/30; B60W 2720/106; B60W 30/143; B60W 30/16
See application file for complete search history.

(56) References Cited

U.S. PATENT DOCUMENTS

| | | | |
|---|---|---|---|
| 5,808,374 A * | 9/1998 | Miller ................ | B60K 35/00 200/61.54 |
| 7,090,616 B2 * | 8/2006 | Henneken .......... | F16H 61/0213 477/107 |
| 2002/0095254 A1 * | 7/2002 | Egawa ............... | B60K 31/0008 701/96 |
| 2005/0080565 A1 * | 4/2005 | Olney ................ | B60K 31/0008 701/301 |
| 2005/0107673 A1 * | 5/2005 | Ball ................... | A61B 5/411 600/301 |
| 2007/0043491 A1 * | 2/2007 | Goerick ............. | B60K 28/165 701/41 |
| 2008/0268866 A1 * | 10/2008 | Sukkarie ............ | G07C 5/008 455/456.1 |
| 2010/0131148 A1 * | 5/2010 | Camhi ............... | B60W 40/09 701/31.4 |
| 2010/0152951 A1 * | 6/2010 | Chin .................. | B60W 40/09 701/31.4 |
| 2011/0040467 A1 * | 2/2011 | Breuer .............. | B60T 7/22 701/96 |
| 2011/0102166 A1 * | 5/2011 | Filev ................. | B60W 30/02 304/435 |
| 2011/0184642 A1 * | 7/2011 | Rotz ................. | G01C 21/3492 701/533 |
| 2011/0282558 A1 * | 11/2011 | Park .................. | B60W 30/143 701/94 |
| 2012/0215415 A1 * | 8/2012 | Schramm .......... | B60W 30/143 701/93 |
| 2012/0239253 A1 * | 9/2012 | Schmidt ............ | B60T 7/22 701/41 |
| 2013/0295900 A1 * | 11/2013 | Hood ................. | H04W 4/04 455/418 |
| 2014/0266655 A1 * | 9/2014 | Palan ................ | G06K 9/00805 340/435 |

* cited by examiner

*Primary Examiner* — Redhwan k Mawari
(74) *Attorney, Agent, or Firm* — Ralph E. Smith

(57) ABSTRACT

Methods and systems for implementing personalized driver assistance features such as adaptive cruise control, adaptive cruise control with stop and go, and forward collision warning. The methods and systems collect specific vehicle data and then calculate values that populate a histogram representing driver habits and tendencies regarding following and stopping distances in relation to objects ahead of the vehicle. The methods and systems utilize the histogram data to provide the driver with a personalized driver assistance features.

20 Claims, 5 Drawing Sheets

ADAPTIVE CRUISE CONTROL SYSTEM AND METHOD

FIELD

The present disclosure relates generally to a driver assistance method and system for controlling a vehicle and, more particularly, to a driver assistance method and system that is tunable for a specific driver.

BACKGROUND

There are several types of driver assistance systems used in today's vehicles. These systems use forward sensors to control a vehicle and/or provide feedback or warnings based on objects in the vehicle's path. Passive driver assistance systems provide feedback or warnings to a driver but do not directly control the vehicle. An example of a passive driver assistance system is a forward collision warning system which warns a driver that an object is present in front of the vehicle, but requires that the driver, not the system, operate the vehicle so as to avoid a collision. The warning or feedback features of passive driver assistance systems may optionally be disabled, even while the passive driver assistance system continues to collect data regarding driving conditions. On the other hand, active driver assistance systems not only provide warnings but also actively control the vehicle. Examples of active driver assistance systems include adaptive cruise control and adaptive cruise control with a stop and go feature.

Adaptive cruise control, sometimes referred to as active cruise control, automatically reduces the vehicle's speed when a slower vehicle appears in the lane ahead to ensure that the cruise controlled vehicle is at a safe following distance. The adaptive cruise control system will accelerate the vehicle back to its set cruise control speed when the lane becomes free or the distance between the two vehicles increases to the safe following distance. An adaptive cruise control system with a stop and go feature will apply the vehicle's brakes until the vehicle comes to a stop (if necessary) before allowing the vehicle to go off again when the traffic ahead moves.

A forward collision warning system is a safety system designed to reduce the severity of an accident. These systems use radar and sometimes laser sensors to detect an imminent crash. Depending on how the system is implemented, the system may warn the driver, precharge the brakes, inflate seats for extra support, move the passenger seat, position head rests to avoid whip lash, tension seat belts and/or automatically apply braking to minimize impact.

Current driver assistance systems use static tunings for the vehicle control thresholds and warnings. This means that the driver is locked-in to the vehicle's available tuning selections, which may be limited and may not satisfy all drivers. Accordingly, there is a need and desire for a driver assistance system and method that are tunable for a specific driver of the vehicle.

SUMMARY

In one form, the present disclosure provides a method of controlling at least one driver assistance feature of a vehicle. The method comprises determining, by a processor, if the at least one driver assistance feature is associated with stored learned driver specific data; performing the at least one driver assistance feature based on the learned driver specific data if it is determined that the at least one driver assistance feature is associated with stored learned driver specific data; and performing the at least one driver assistance feature based on vehicle specific data if it is determined that the at least one driver assistance feature is not associated with stored learned driver specific data.

The present disclosure also provides an engine system of a vehicle. The system comprises a throttle connected to an intake manifold connected to the engine; at least one sensing system; and a controller connected to the throttle, the at least one sensing system and the engine. The controller is adapted to determine if the at least one driver assistance feature is associated with stored learned driver specific data, perform the at least one driver assistance feature based on the learned driver specific data if it is determined that the at least one driver assistance feature is associated with stored learned driver specific data, and perform the at least one driver assistance feature based on vehicle specific data if it is determined that the at least one driver assistance feature is not associated with stored learned driver specific data.

In one embodiment, the at least one driver assistance feature comprises at least one of an adaptive cruise control feature, an adaptive cruise control with stop and go feature or a forward collision warning feature. In one embodiment, the performance of the at least one driver assistance feature based on the learned driver specific data may comprise at least one of implementing a driver learned stopping distance when stopping the vehicle, implementing a driver learned following distance when the vehicle is moving or implementing a driver learned forward collision warning when the vehicle is approaching an object in the vehicle's path.

In another embodiment, the learned driver specific data is obtained during use of the vehicle only when an object is detected within the vehicle's path and when either no active driver assistance feature is engaged, therefore either modifying or completely overriding the driver's inputs to the vehicle, or when no passive driver assistance feature is communicating a requested change to the driver's behavior in controlling the vehicle. The learned driver specific data comprises a plurality of average following distances and a plurality of average time gaps, each average following distance and average time gap being associated with a respective vehicle speed.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

The disclosed system and methods will allow driver assistance systems to adapt and tune themselves to the specific driving habits of an individual driver. The system and methods disclosed herein are not designed to change driver behavior, but are instead designed to tune system responses to the driver's normal/typical driving behavior. Thus, a better overall experience is provided to the driver, which will increase customer satisfaction for the vehicle.

One disclosed method collects specific vehicle data and then calculates values that populate a histogram that represents driver habits and tendencies regarding following and stopping distances in relation to objects ahead of the vehicle. Another method disclosed herein utilizes the data calculated in the first method to provide the driver with a "personalized" adaptive cruise control and forward collision warning experience.

Figure 1:
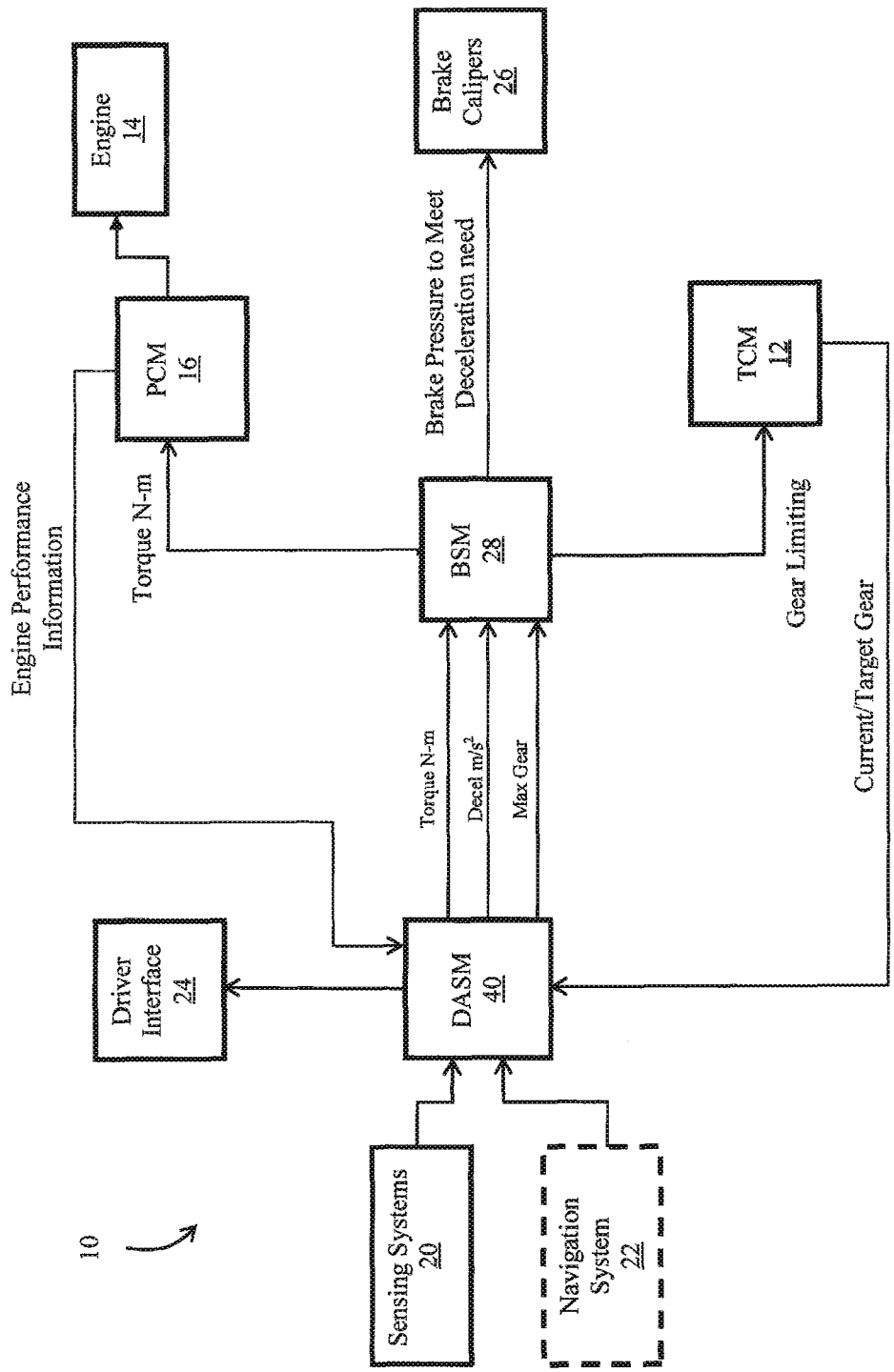
FIG. 1 illustrates an example driver assistance system that is tunable for a driver of a vehicle according to an embodiment disclosed herein.

FIG. 1 illustrates an example driver assistance system 10 that is tunable for a driver of a vehicle according to an embodiment disclosed herein. The system 10 includes an engine 14 and a drivers assistance system module (DASM) 40. The DASM 40 could be a processor programmed to perform the methods 100, 200, 300 discussed below and/or other necessary controller functions. The DASM 40 receives information from the engine 14 or other control modules. For example, in FIG. 1, the DASM 40 receives information from a powertrain control module (PCM) 16 configured to control the engine (for example, by controlling a throttle). The engine performance information received from the PCM 16 may include, for example, engine speed. The DASM 40 also receives information from a transmission control module (TCM) 12. The received information from the TCM 12 may include the vehicle's current gear or a target gear, for example. The DASM 40 could also receive information from other control modules. The DASM 40 acts upon the information received from the PCM 16 and TCM 12, for example, and outputs its own control signals in order to alter vehicle performance. In FIG. 1, the DASM 40 outputs control signals to a brake system module (BSM) 28, which itself outputs signals to other control modules. For example, the DASM 40 can output a control signal to limit the engine torque. The torque control signal is output from the DASM 40 to the BSM 28, which then instructs the PCM 16 accordingly so that operation of the engine 14 may be appropriately altered. As another example, the DASM 40 can output a control signal to limit the maximum gear to be used by the vehicle's transmission. The maximum gear control signal is output from the DASM 40 to the BSM 28, which then instructs the TCM 12 so as to limit the gears used by the transmission. The DASM 40 could also output a deceleration control signal. This signal would be received by the BSM 28, which would then output a corresponding brake pressure command to the vehicle's brake calipers 26. The control signals output by the DASM 40 are not limited to those illustrated in FIG. 1, but could include additional control signals output to either the BSM 28 or to other vehicle systems. The control signals are generated either by the DASM 40 or by a cruise control function within the DASM 40. It should be noted that the cruise control function could be a separate module/component of the system 10, if desired.

The DASM 40 is also coupled to "sensing systems" 20. By way of example, and not limitation, the sensing systems 20 include, but are not limited to, radar, forward vision (camera), ultrasonic, and infrared (laser) sensing systems/sensors. The sensing systems 20 will provide the DASM 40 with data and information needed to make following/stopping distance determinations and or other determinations described below. The DASM 40 may be optionally connected to a navigation system 22 or one or more navigation data sources (e.g., compass or GPS receiver). The navigation system 22 could provide useful information to the DASM 40 such as e.g., the speed limit for the road being traveled.

The DASM 40 is also connected to a driver interface 24, which may be part of the vehicle's dashboard display, on-board menus, and/or audio sound system. As explained below, the DASM 40 can send warning signals to the driver interface 24 to alert the driver of an imminent crash. Although not shown, the DASM 40 can be connected to other in-cabin components so that it can inflate seats, move the passenger seat, position head rests to avoid whip lash, and/or tension seat belts seats as part of a forward collision warning or perform some of the functions described below. It should be appreciated that FIG. 1 illustrates one example system 10 and the principles disclosed herein are not limited solely to the FIG. 1 illustrated configuration.

Figure 2:
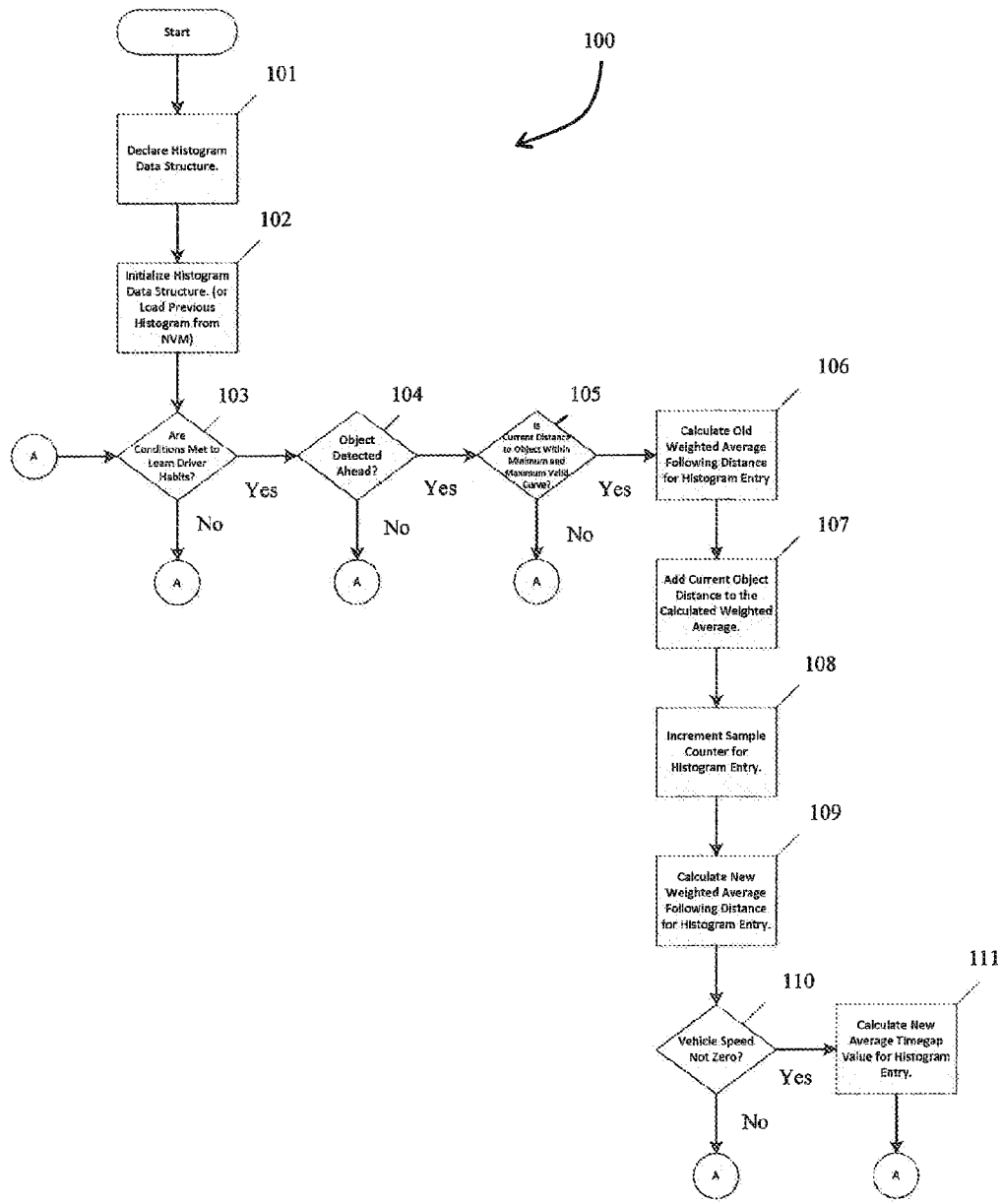
FIG. 2 illustrates a flowchart of an example method of gathering and processing information used in the FIG. 1 system.

FIG. 2 illustrates an example method 100 of gathering and processing information used in the FIG. 1 system 10. In a desired embodiment, the method 100 is implemented in software, stored in a computer readable medium, which could be a random access memory (RAM) device, non-volatile random access memory (NVRAM) device, or a read-only memory (ROM) device) and executed by the DASM 40, which may be or include a processor, or other suitable controller within the system 10 of FIG. 1. Moreover, the computer readable medium can be part of the DASM 40 or external to the DASM 40.

The method 100 can be performed continuously or periodically as part of background or normal processing of the DASM 40 while the vehicle is not performing a cruise control or forward collision warning operation (as discussed in more detail below). As will be described below, method 100 collects following distance measurements for the closest in-path vehicle (CIPV) ahead of the host vehicle as measured by one or more of the forward sensing systems 20 on the vehicle. This information is then compiled in a histogram as part of a software data structure or table as shown below in Table 1. This data structure/table should be stored in a non-volatile memory to ensure that the information is retained. It should be appreciated that the histogram information can also be stored in hardware (e.g., registers), if desired.

TABLE 1

Example Histogram Data Structure

| Vehicle Speed Increment (Km/h) | Sample Count (Counts) | Average Following Distance (Meters) | Average Timegap (Seconds) |
|---|---|---|---|
| 0 | | | |
| 1 | | | |
| ... | | | |
| [MAX_SPEED_KMH] − 1 | | | |
| [MAX_SPEED_KMH] | | | |

Therefore, the first step in the method 100 is to set up or declare the data structure/table for the histogram (step 101). Once established, the histogram data structure is initialized (step 102). It should be noted that if a populated histogram data structure already exists, step 101 would be skipped and step 102 would consist of loading the previous histogram data structure from the non-volatile storage. The remaining steps of the method 100 (i.e., steps 103 through 111) would be performed continuously/periodically to ensure that the histogram is up to date.

At step 103, the DASM 40 makes a determination as to whether the conditions are suitable to learn a driver's habits (step 103). Initially, it is noted that data should only be collected while the adaptive cruise control feature is disengaged. That is, to prevent the results of the method from being skewed, data should only be collected while the vehicle is being driven by the driver without influence from any type of driver assistance system. In other words, the data should only be collected when the vehicle is not being controlled by the adaptive cruise control system or other active driver assistance system. Similarly, if a passive driver assistance system is used, the data should only be collected when the warning or feedback feature of the passive driver assistance system is not providing feedback to the driver. Thus, one check performed at step 103 is to determine if the adaptive cruise control or other active driver assistance system or a driver warning or feedback feature of a passive driver assistance system is engaged. If it is determined that the adaptive cruise control or other active driver assistance system or some other driver warning or feedback feature is engaged, the method 100 will loop back to step 103.

If desired, other conditions can be checked at step 103 to make sure the conditions are optimal for learning the driver's habits. For example, a check can be made to see if the vehicle's yaw rate is too high, if the steering angle is too high or if the acceleration rate is too high to make a proper driving habit determination (i.e., these are not normal driving habits). Moreover, if desired, the method 100 may only want to collect data while the vehicle is cruising at a steady speed. If so, the conditions at step 103 would not be met if the vehicle is accelerating or decelerating. If any condition indicates that it is not suitable to learn a driver's habits (at step 103), the method 100 will loop back to step 103. If, however, the conditions indicate that it is suitable to learn a driver's habits (at step 103), the method 100 continues at step 104.

At step 104, the DASM 40 determines if an object has been detected ahead of the host vehicle. Because the method 100 is designed for tuning adaptive cruise control (with or without stop and go) and forward collision warning maneuvers in response to a detected object in the vehicle's path, data should not be collected when there is no object in the vehicle's path. As such, if the DASM 40 determines that there is no object ahead of the host vehicle, the method 100 will loop back to step 103. If, however, the DASM 40 determines that there is an object ahead of the host vehicle, the method continues at step 105. It should be appreciated that although shown as separate steps, the determinations of steps 103 and 104 could be made within the same step, if desired.

At step 105, the DASM 40 determines if the current distance to the object (currObjDist) is within a maximum and minimum valid curve. The maximum and minimum valid curve is used to ensure that only data from relevant following distances between the host vehicle and detected object are used in the computations described below. The maximum and minimum valid curve can be established by the manufacturer based on historical data/information. The maximum and minimum valid curve contains one conservative, yet safe upper limit for conservative drivers and a second, more aggressive, yet still safe lower limit for more aggressive drivers. As such, if the DASM 40 determines that the current distance to the object is outside the maximum and minimum valid curve, the method 100 will loop back to step 103. If, however, the DASM 40 determines that the current distance to the object is within the maximum and minimum valid curve, the method continues at step 106.

At step 106, the DASM 40 calculates an old weighted average following distance (WeightedAve) based on the current histogram entries for the current vehicle speed (vehSpeed). That is, the histogram's average following distance for the current vehicle speed (histAvgDist[vehSpeed]) is multiplied by the histogram's count for the current vehicle speed (histCount[vehSpeed]) as shown below:

$$\text{WeightedAve} = \text{histAvgDist}[\text{vehSpeed}] * \text{histCount}[\text{vehSpeed}] \quad (1)$$

The current distance to the object (currObjDist) is then added to the old weighted average following distance (WeightedAve) at step 107 as follows.

$$\text{WeightedAve} = \text{WeightedAve} + \text{currObjDist} \quad (2)$$

At step 108, the histogram's sample count for the current vehicle speed (histCount[vehSpeed]) is incremented by one and stored in the histogram. At step 109, a new weighted average following distance (histAvgDist[vehSpeed]) to be stored in the histogram entry for the current vehicle speed (vehSpeed) is calculated by dividing the weighted average following distance (WeightedAve) calculated at step 107 by the updated histogram's sample count for the current vehicle speed (histCount[vehSpeed]) as shown below. The new weighted average following distance for the current vehicle speed is then stored in the histogram.

$$\text{histAvgDist}[\text{vehSpeed}] = \text{WeightedAve}/\text{histCount}[\text{vehSpeed}] \quad (3)$$

The method 100 will determine average time gaps for each vehicle speed except for a vehicle speed of zero. As such, at step 110, the DASM 40 determines if the current vehicle speed (vehSpeed) is greater than zero. If the DASM 40 determines that the current vehicle speed (vehSpeed) is zero, the method 100 will loop back to step 103. If, however, the DASM 40 determines that the current vehicle speed (vehSpeed) is not zero, the method 100 continues at step 111 where a new average time gap for the current vehicle speed is calculated (histAveTimeGap[vehSpeed]) as shown below. The variable "k" is a constant used for converting between Km/h and m/sec (if using the units shown in Table 1). After step 111, the method 100 will loop back to step 103.

$$\text{histAveTimeGap}[\text{vehSpeed}] = \text{histAvgDist}[\text{vehSpeed}]/(k*\text{vehSpeed}) \quad (4)$$

Figure 3:
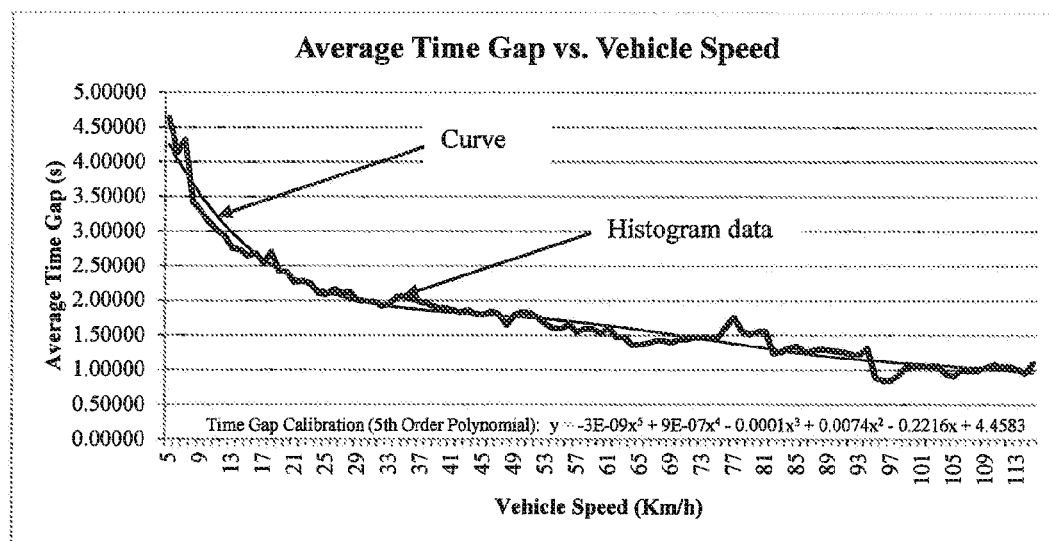
FIG. 3 illustrates a graph of an example time gap curve according to an embodiment disclosed herein.

All entries in the histogram that are above 0 Km/h with enough samples can be used to develop a time gap curve as shown in FIG. 3. This time gap curve changes in real-time as the method 100 is repeated during the vehicle's operation. As discussed below with reference to FIG. 4, this time gap curve can be used as a "personalized" gap setting, in addition to the vehicle's standard gap settings, for any adaptive cruise control (with or without stop and go) or forward collision warning maneuver such that the system would follow objects ahead of the host vehicle at the same or similar distance that the driver tends to follow while driving without the system engaged. FIG. 3 shows the time gap curve as determined by a $5^{th}$ order polynomial calculation based on the histogram data. It should be noted, however, that predictive learning, such as the type often associated with a Kalman filter technique, could also be used to develop a time gap curve, if desired. That is, the method 100 is not limited to how the time gap curve is developed.

Figure 4:
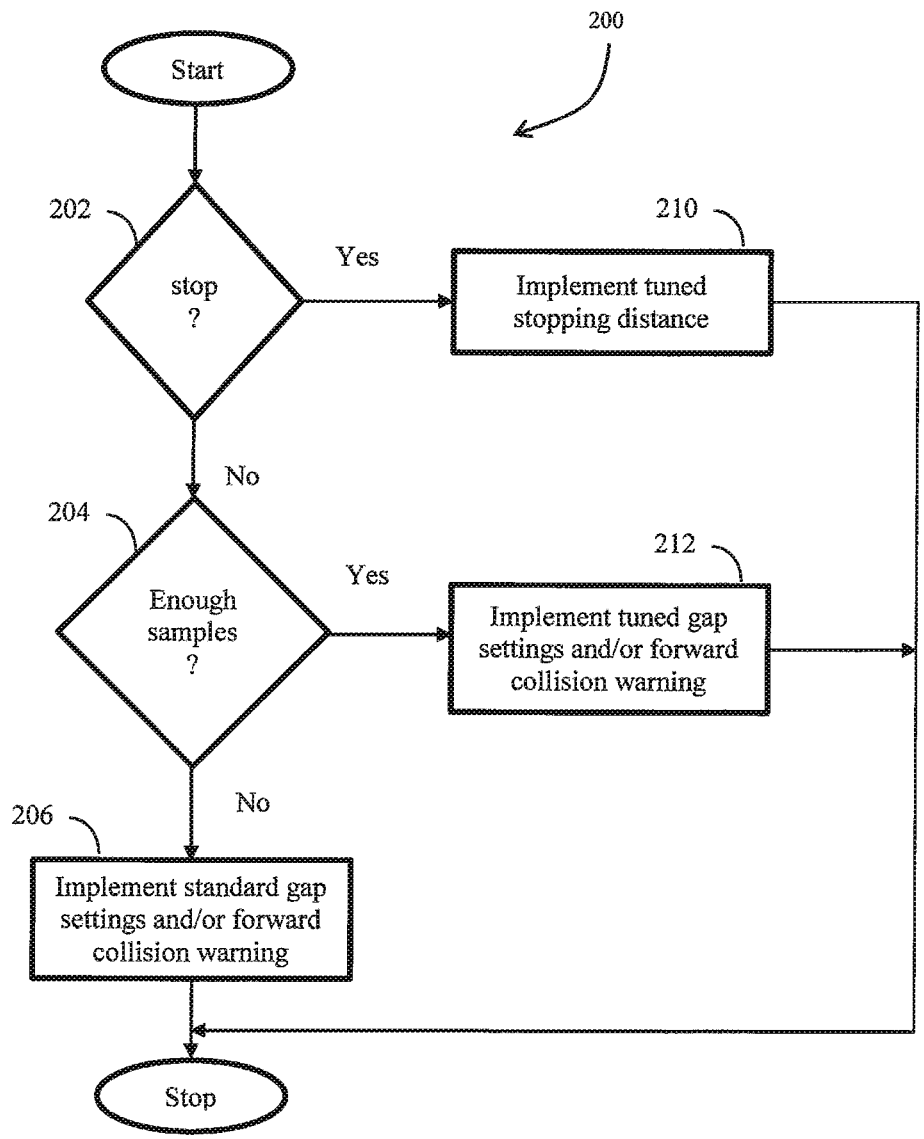
FIG. 4 illustrates a flowchart of an example method implementing a driver assistance feature in accordance with an embodiment disclosed herein.

FIG. 4 illustrates an example method 200 implementing a driver assistance feature in accordance with an embodiment disclosed herein. As discussed above, method 100 populates a histogram of information regarding a driver's typical following distances and time gaps between the host vehicle and an object in the vehicle's path when the driver assistance features are disabled. Once the driver assistance feature(s) are enabled, this information can be used to provide the driver with a "personalized" adaptive cruise control and forward collision warning experience.

For example, the histogram's first entry, corresponding to a vehicle speed of 0 Km/h, can be used to tailor the adaptive cruise control with stop and go feature such that the vehicle will stop behind stationary objects at the same distance that the driver tends to stop while driving without the driver assistance system engaged. Thus, at step 202, if the DASM 40 determines that the vehicle needs to stop, the method 200 continues at step 210 to implement a tuned stopping distance. That is, the DASM 40 uses the average following distance associated with the histogram's 0 Km/h entry as the vehicle's stopping distance.

If the DASM 40 determines that the vehicle does not need to stop, the method 200 continues at step 204, where the DASM 40 determines if there have been enough samples to implement driver tuned gap settings and/or forward collision warning. AN entries in the table above 0 Km/h with enough samples populated will have a time gap curve as described above. This time gap curve can then be used at step 212 to implement a "personalized" gap setting for the adaptive cruise control feature (with or without Stop and Go). Likewise, all entries in the table above 0 Km/h with enough samples populated can be used to create a custom forward collision warning tuning to adapt to the driving habits of the driver and virtually eliminate warnings that would be perceived as too early. If the DASM 40 determines that there have not been enough samples to implement driver tuned gap settings and/or forward collision warning (at step 204), the method 200 continues at step 206 where the vehicle's standard gap settings and/or forward collision warning features are implemented.

Figure 5:
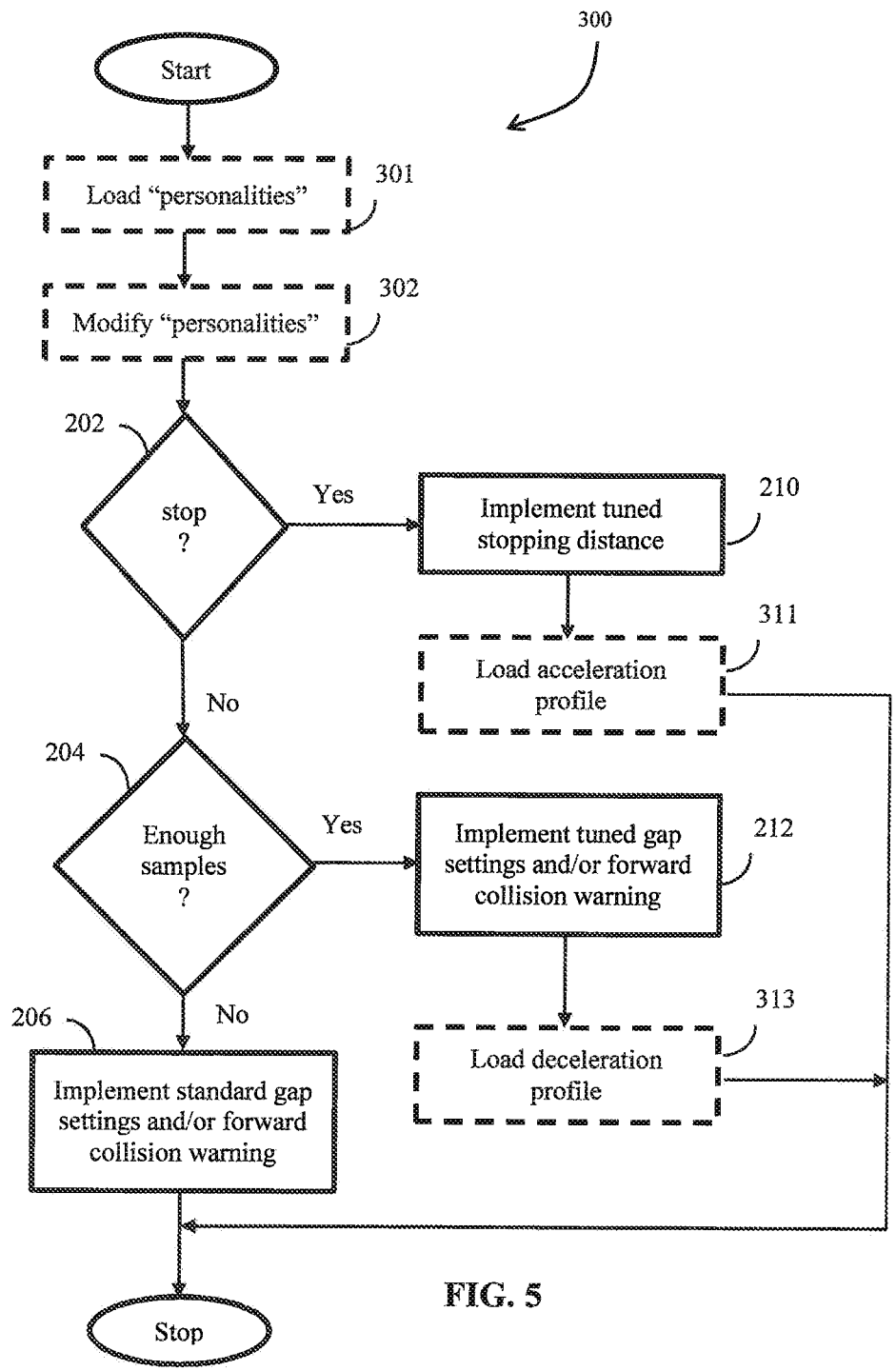
FIG. 5 illustrates a flowchart of another example method implementing a driver assistance feature in accordance with an embodiment disclosed herein.

The concepts disclosed herein can be extended to implement other optional features. FIG. 5 illustrates another example method 300 that can include some of these features, if desired. For example, the system 10 and method 100 can be set up to select and load multiple "personalities" based on e.g., which key fob is being used or which seat memory button was pressed, etc. That is, the habits of two or more drivers (i.e., "personalities") can be learned and associated with a specific item (e.g., particular key fob or seat memory button, etc.) and stored in a separate histogram associated with that item. When driver assistance is enabled, the histogram associated with the item being used (or pressed) is loaded at step 301.

As another alternative feature, the implemented learned driver behavior/personality, whether associated with a particular item as in step 301 or not, can be modified at step 302 based on the status of in-vehicle nomadic devices such as cell phones, etc. That is, when a call is in session, the system tunings become more conservative based on the presumption that the driver's reaction time would be increased due to decreased driver attentiveness. That is stopping distances and time gaps would be increased, or a forward collision warning could be issued earlier, as a result of potential driver inattentiveness. This modification can also occur based on driver workload such as e.g., the driver pressing buttons on the dashboard or audio system, which also indicate that the driver's reaction time would be increased. It should be appreciated that this modification could also be used to modify the vehicle's standard gap settings and/or forward collision warning settings as this modification is based on in-vehicle behavior and is not tied to a specific driver of the vehicle.

Another optional feature, which could be implemented at step 311 is the creation and use of a driver specific acceleration profile. A driver specific acceleration profile represents a specific driver's acceleration characteristics when the vehicle or driver is not constrained by the proximity of another vehicle in front of the driver's vehicle. Thus, in method 100, data could be collected in the specific situation where no other vehicle is in front of and proximate to the host vehicle (as determined via the sensing systems 20), and where the host vehicle is stationary (i.e., at red lights, stop signs, etc.) before the driver accelerates to the posted speed limit. This acceleration profile could then be used at step 311 to provide a personalized adaptive cruise control or adaptive cruise control with stop and go acceleration profile when engaged. The posted speed limit could be determined based on many known techniques including the use of map data and/or machine vision. It should be appreciated that how the speed limit is determined is not necessary to practice the disclosed method 300.

Similarly, method 100 could collect data in the specific situation where the host vehicle is approaching slower objects and then the driver decelerates to maintain a safe following distance. This would provide a personalized adaptive cruise control or adaptive cruise control with stop and go deceleration profile that can be implemented at step 313, when engaged.

Moreover, in a desired embodiment, all collected histogram data will be accessible by dealerships via diagnostic tools or wireless communications. The data can be collected anonymously to create anonymous driver tendency information that can be used to provide refined standard tunings for the adaptive cruise control (with our without stop and go) and forward collision warning systems. This should increase customer satisfaction with the vehicle's standard settings for these features. The collected information can be analyzed with respect to different attributes tied to the collected information including e.g., vehicle age, geographic regions, vehicle type, trim level, and optional equipment. Once the data is analyzed, refined standard settings can be downloaded to the appropriate vehicles, substantially improving the standard settings based on data collected from actual drivers of the vehicles.

What is claimed is:

1. A method for controlling a vehicle having a driver assistance feature, the method comprising:
   detecting, by a controller, a learn condition for a driver-specific profile for the driver assistance feature, the learn condition including (i) operation of the vehicle, (ii) disablement of the driver assistance feature, and (iii) a detected object in a path of the vehicle;
   in response to detecting the learn condition, receiving, at the controller, measured parameters associated with the vehicle and the driver assistance feature;
   based on the measured parameters, generating, by the controller, the driver-specific profile for the driver assistance feature;
   detecting, by the controller, enablement of the driver assistance feature; and
   in response to detecting the enablement of the driver assistance feature, performing, by the controller, driver assistance of the vehicle using the driver-specific profile.

2. The method of claim 1, further comprising when (i) the learn condition is not detected, (ii) the vehicle is being operated, and (iii) the driver assistance features is enabled, performing, by the controller, driver assistance of the vehicle using a default profile associated with the vehicle.

3. The method of claim 2, further comprising:
   detecting, by the controller, a call condition comprising (i) a telephone call by a driver of the vehicle, (ii) operation of the vehicle, and (iii) enablement of the driver assistance feature;

in response to detecting the call condition, obtaining, by the controller, an adjusted profile by adjusting the driver-specific profile or the default profile to be less aggressive;

performing, by the controller, driver assistance of the vehicle during the telephone call using the adjusted profile; and in response to detecting an end of the telephone call, performing, by the controller, driver assistance using the profile.

4. The method of claim 1, wherein the learn condition further includes the vehicle cruising at a steady speed.

5. The method of claim 1, wherein the learn condition further includes a specific parameter of the measured parameters being within corresponding thresholds indicative of normal driving habits.

6. The method of claim 5, wherein the specific parameter is an acceleration of the vehicle.

7. The method of claim 5, wherein the specific parameter is a yaw rate of the vehicle.

8. The method of claim 5, wherein the specific parameter is a steering angle of the vehicle.

9. The method of claim 1, further comprising associating, by the controller, the driver-specific profile with a specific key fob of the vehicle.

10. The method of claim 1, further comprising associating, by the controller, the driver-specific profile with a specific driver memory key in the vehicle.

11. A system for a vehicle having a driver assistance feature, the system comprising:
   one or more sensors configured to measure parameters associated with the vehicle and the driver assistance feature; and
   a controller configured to:
      detect a learn condition for a driver-specific profile for the driver assistance feature, the learn condition including (i) operation of the vehicle, (ii) disablement of the driver assistance feature, and (iii) a detected object in a path of the vehicle;
      in response to detecting the learn condition, receive the measured parameters;
      based on the measured parameters, generate the driver-specific profile for the driver assistance feature;
      detect enablement of the driver assistance feature; and
      in response to detecting the enablement of the driver assistance feature, perform driver assistance of the vehicle using the driver-specific profile.

12. The system of claim 11, wherein the controller is further configured to when (i) the learn condition is not detected, (ii) the vehicle is being operated, and (iii) the driver assistance features is enabled, perform driver assistance of the vehicle using a default profile associated with the vehicle.

13. The system of claim 12, wherein the controller is further configured to:
   detect a call condition comprising (i) a telephone call by a driver of the vehicle, (ii) operation of the vehicle, and (iii) enablement of the driver assistance feature;
   in response to detecting the call condition, obtain an adjusted profile by adjusting the driver-specific profile or the default profile to be less aggressive;
   perform driver assistance of the vehicle during the telephone call using the adjusted profile; and
   in response to detecting an end of the telephone call, perform driver assistance using the profile.

14. The system of claim 11, wherein the learn condition further includes the vehicle cruising at a steady speed.

15. The system of claim 11, wherein the learn condition further includes a specific parameter of the measured parameters being within corresponding thresholds indicative of normal driving habits.

16. The system of claim 15, wherein the specific parameter is an acceleration of the vehicle.

17. The system of claim 15, wherein the specific parameter is a yaw rate of the vehicle.

18. The system of claim 15, wherein the specific parameter is a steering angle of the vehicle.

19. The system of claim 11, wherein the controller is further configured to associate the driver-specific profile with a specific key fob of the vehicle.

20. The system of claim 11, wherein the controller is further configured to associate the driver-specific profile with a specific driver memory key in the vehicle.

* * * * *